(12) United States Patent
Kern (10) Patent No.: US 7,426,418 B2
(45) Date of Patent: Sep. 16, 2008

(54) SYSTEMS AND METHODS FOR CALCULATING ALERTS BASED ON PEGGING

(75) Inventor: Thomas Kern, Wiesloch (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/448,303

(22) Filed: Jun. 7, 2006

(65) Prior Publication Data

US 2007/0288111 A1    Dec. 13, 2007

(51) Int. Cl.
G06F 19/00  (2006.01)

(52) U.S. Cl. .................... 700/99; 700/106; 700/100

(58) Field of Classification Search .............. 700/99, 700/106, 107, 95, 100, 102; 705/22
See application file for complete search history.

(56) References Cited

U.S. PATENT DOCUMENTS

| | | | |
|---|---|---|---|
| 6,477,660 B1 * | 11/2002 | Sohner | 714/1 |
| 2003/0036984 A1 * | 2/2003 | Chiu et al. | 705/28 |
| 2004/0030428 A1 * | 2/2004 | Crampton et al. | 700/101 |
| 2005/0265083 A1 * | 12/2005 | Perry | 365/189.01 |

* cited by examiner

*Primary Examiner*—Kidest Bahta
*Assistant Examiner*—Nathan Laughlin
(74) *Attorney, Agent, or Firm*—Cooper & Dunham LLP (57) ABSTRACT

A system and method for performing supply chain planning, includes providing a plurality of demand orders, each demand order including at least one input interface node, each input interface node identifying a type of material required by said demand order, a quantity of the material required by said demand order and a requirements date the material is required by said demand order, providing a plurality of supply orders, each supply order including at least one output interface node, each output interface node identifying a type of material provided by said supply order, a quantity of the material provided by said supply order and a date the material is provided by said supply order, combining a plurality of said demand orders into an aggregated demand order and forming an aggregated demand time line, each aggregated demand order indicating a quantity of material required, the quantity of material required being a sum of the quantities of the material required by said plurality of demand orders combined into the aggregated demand order and performing an operation for pegging the plurality of supply orders to the aggregated demand orders

24 Claims, 8 Drawing Sheets

SYSTEMS AND METHODS FOR CALCULATING ALERTS BASED ON PEGGING

BACKGROUND

1. Technical Field

The present disclosure relates generally to systems and methods for calculating alerts and, more particularly, to systems and methods for calculating alerts based on pegging.

2. Description of the Background Art

Supply chain planning (SCP) is used today by many manufacturing companies. SCP can be used, for example, to ensure that supplies used in manufacturing an end product are timely delivered so that a customer's order can be timely filled. SCP can involve many aspects of the manufacturing process from making sure that adequate supplies are available to making sure that transportation of the finished product to the customer takes place in a timely and efficient fashion.

Applications are used in the supply chain that create and dynamically alter steps in the supply chain in response to changes in demands and capacity. To ensure the fast and efficient operation of the supply chain, the applications need quick and easy access to data relating to the flow of materials through the supply chain. The way in which this data is stored determines how easily it can be accessed.

Supply chain data is often stored in multiple relational database tables. In early supply chain planning systems, if a part of a manufacturing order was changed, all aspects of the supply chain effected by the change would be recalculated using the data in the relational database tables. However, in early systems, since the information had to be traced through the relational database tables, the systems were cumbersome and unnecessarily delayed planning functions.

Figure 2A:
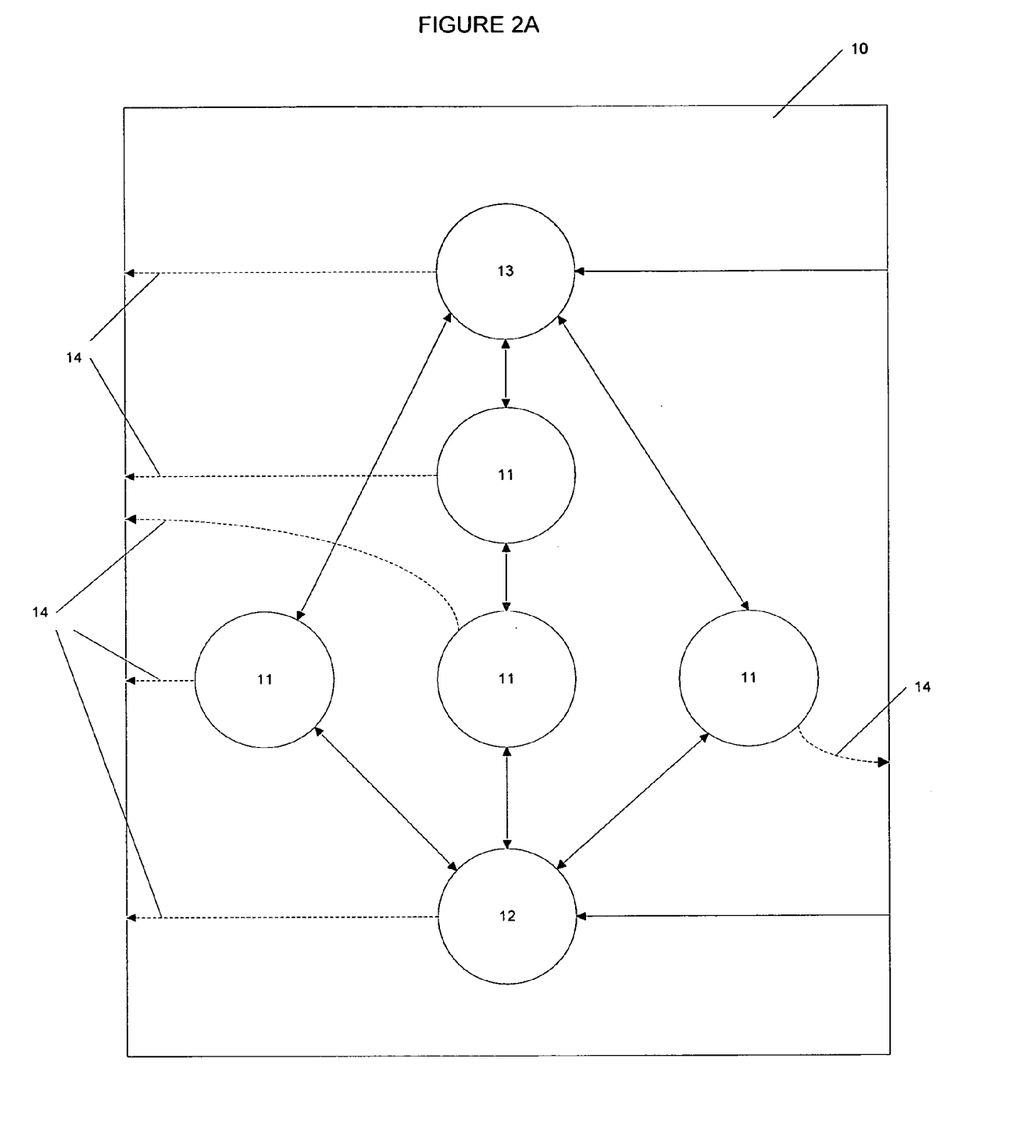
FIG. 2A shows a representation of the relationship between an order and its activities.
Figure 2B:
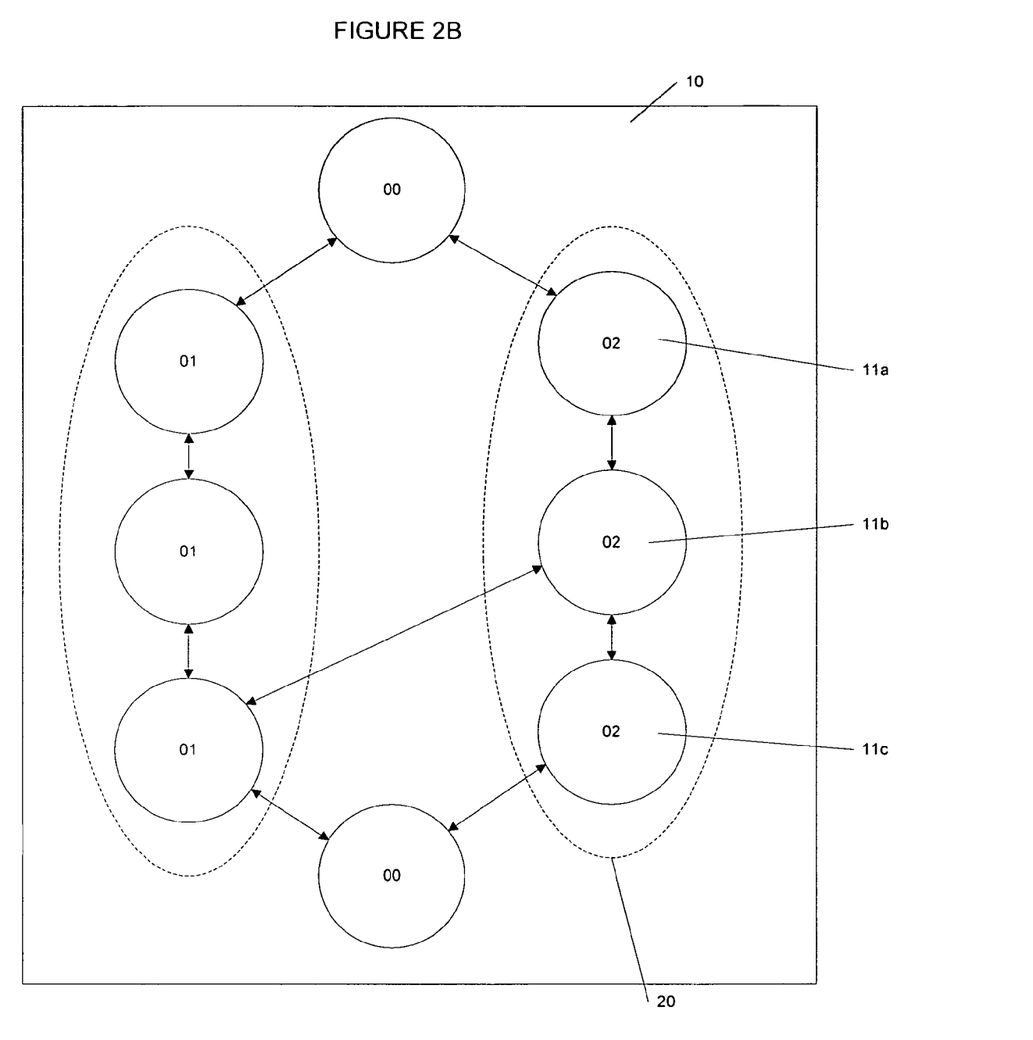
FIG. 2B shows a representation of fusing of activities to make operations.

Systems were thus developed to store all data relevant to supply chain planning in an efficient manner reflecting the progress of materials and orders along the supply chain. An example of such a system is shown in FIG. 2A. Order 10 represents an organizational unit that groups together several activities 11. Each order points to the first activity and the last activity of its activity network. Thus, order 10 points to activity 12 and activity 13. Each activity 11 contains a reference 14 to its corresponding orders. As shown in FIG. 2B, related activities such as a chain of activities 11a, 11b and 11c that must be executed in order may be grouped together into an operation 20 to avoid having to map each activity individually on a planning table.

Figure 2C:
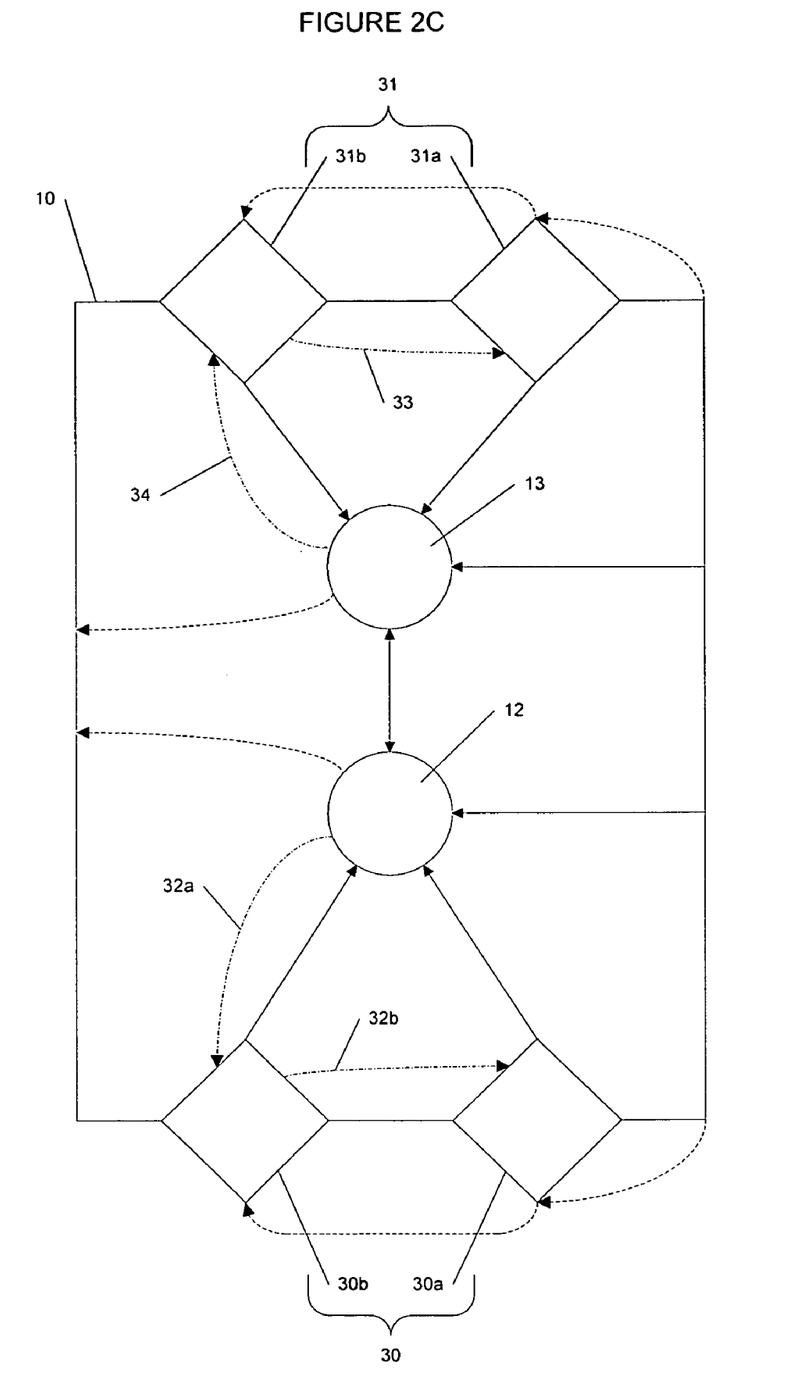
FIG. 2C shows a representation of the input and output interface nodes of an order.

Referring now to FIG. 2C, each order 10 may have one or more input interface nodes 30 and/or one or more output interface nodes 31. Each input interface node 30 represents a material used in fulfilling the order. An input interface node 30 may also include attribute information as to the quantity of the material required, the time requirement of the material and may indicate a shortage of the material. A shortage of a material can be determined, for example, by determining the difference between the quantity of material required and the quantity that is delivered by other orders or stock. Each output interface node 31 also has attributes. These attributes can include the type of material created, the quantity of material created, the time availability of the material and the surplus of the material, if any. Each input interface node 30 may refer to the activity 12, if any, in which the material that it represents is consumed, and each output interface node 31 points to the activity 13, if any, in which the material that it represents is created. If an activity 12 consumes a material, all input materials of this activity can be traced via arrows marked with dashes and dots 32a that point from activity 12 to input interface node 30. If input activity 12 consumes more than one material, arrow 32b joins input interface node 30a to the next input interface node 30b, which links on the same input activity 12.

"Pegging" links two orders when one of the orders supplies a material consumed by the other order. Pegging tracks the type and quantity of material supplied by a subordinate order to a superior order. Pegging thus allows planners to ascertain the superior and subordinate orders for any given order at any given time. If the planner reschedules the dates of an order, pegging allows all other orders influenced by the change to be updated.

Figure 3:
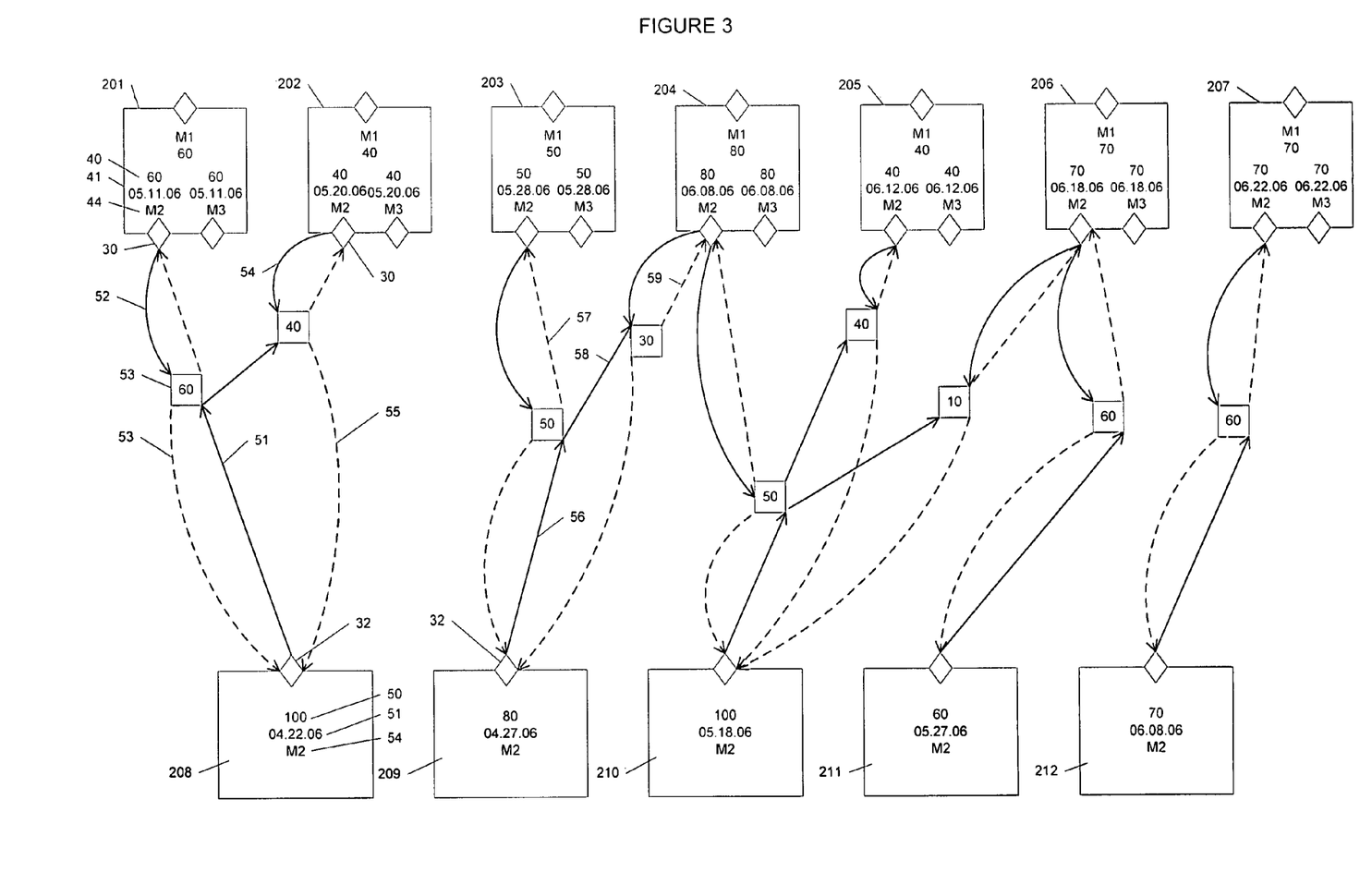
FIG. 3 shows a representation of how pegging between orders can be modeled.

FIG. 3 illustrates an example of pegging between orders, consisting of 12 orders 201-212 that produce or consume materials M1, M2 and/or M3. For example, as shown one un it each of M2 and M3 are used to produce each unit of M1. Next to each input interface node 30 is the type of material 44, the required quantity 40 and the requirements date 41 for the material. For example, order 201 utilizes 60 units each of M2, M3 which are required by May 11, 2006. Next to each output interface node 32 is the type of material 54, the quantity created 50 and the availability date 51 for the material. For example, order 208 produces 100 units of M2 which are available Apr. 22, 2006. Relationships between orders can be mapped with pegging arcs, as shown. For example, the orders which supply order 201 can be found by starting from input interface node 30 of order 201 and alternately following the solid curved arrow lines 52 and the dashed curved arrow lines 53 to output interface node 32 of order 208. Similarly, the orders that supply order 202 can be found by starting from the input interface node 30 of order 202 and alternately following the solid curved arrow lines 54 and the dashed curved arrow lines 55 to output interface node 32 of order 208. The orders which order 209 supplies can be found by starting from output node 32 of order 209 and alternately following solid straight arrow lines 56 and dashed straight arrow lines 57 to input node 30 of order 203 and solid straight arrow line 58 and dashed straight arrow line 59 to input node 30 of order 204. The values shown in nodes 57 represent the quantity of materials being provided by an order. For ease of description, orders supplying M3 are omitted and only orders supplying M2 are shown. Of course, it will be appreciated that in reality, pegging arcs can also be shown for orders supplying M3, either separate from or together with the orders supplying M2.

Pegging is thus always global and essentially matches supply and demand. Accordingly, although pegging can link a large network of orders, pegging in this way also requires that all demands for materials be matched to all outputs of the materials. In order to do this, all orders and materials have to be considered. Accordingly, it can be difficult to determine when material supply may come up short, particularly in high volume situations when many orders are involved.

Alerts can be used to notify an operator when material supply comes up short. Alerts can be calculated on deviation in quantity. For example, a lateness alert is based on pegging. To properly perform pegging, all inputs and outputs have to be taken into account. Present systems read all input nodes and output nodes and calculate pegging and alerts using the information. However, reading all input and output nodes and calculating pegging and alerts based thereon can be time consuming and require a large amount of memory. If many orders are involved, pegging and/or alerts can be particularly difficult to show to a user in a meaningful manner.

Accordingly, there is a need to provide a system that enables information to be presented to a user that is meaningful and useful.

SUMMARY

This application describes tools (in the form of methodologies, apparatuses, and systems) for calculating alerts. The tools may be embodied in one or more computer programs stored on a computer readable medium or program storage device and/or transmitted in the form of a computer data signal in one or more segments via a computer network or other transmission medium.

A method for performing supply chain planning, comprises providing a plurality of demand orders, each demand order including at least one input interface node, each input interface node identifying a type of material required by said demand order, a quantity of the material required by said demand order and a requirements date the material is required by said demand order, providing a plurality of supply orders, each supply order including at least one output interface node, each output interface node identifying a type of material provided by said supply order, a quantity of the material provided by said supply order and a date the material is provided by said supply order, combining a plurality of said demand orders into an aggregated demand order and forming an aggregated demand time line, each aggregated demand order indicating a quantity of material required, the quantity of material required being a sum of the quantities of the material required by said plurality of demand orders combined into the aggregated demand order and performing an operation for pegging the plurality of supply orders to the aggregated demand orders.

A programmed computer system for performing supply chain planning, comprises a processor, a program storage device readable by the processor, tangibly embodying a program of instructions executable by the processor to perform a method comprising providing a plurality of demand orders, each demand order including at least one input interface node, each input interface node identifying a type of material required by said demand order, a quantity of the material required by said demand order and a requirements date the material is required by said demand order, providing a plurality of supply orders, each supply order including at least one output interface node, each output interface node identifying a type of material provided by said supply order, a quantity of the material provided by said supply order and a date the material is provided by said supply order, combining a plurality of said demand orders into an aggregated demand order and forming an aggregated demand time line, each aggregated demand order indicating a quantity of material required the quantity of material required being a sum of the quantities of the material required by said plurality of demand orders combined into the aggregated demand order and performing an operation for pegging the plurality of supply orders to the aggregated demand orders.

A computer recording medium including computer executable code for performing supply chain planning the computer recording medium comprising code for providing a plurality of demand orders, each demand order including at least one input interface node, each input interface node identifying a type of material required by said demand order, a quantity of the material required by said demand order and a requirements date the material is required by said demand order, code for providing a plurality of supply orders, each supply order including at least one output interface node, each output interface node identifying a type of material provided by said supply order, a quantity of the material provided by said supply order and a date the material is provided by said supply order, code for combining a plurality of said demand orders into an aggregated demand order and forming an aggregated demand time line, each aggregated demand order indicating a quantity of material required, the quantity of material required being a sum of the quantities of the material required by said plurality of demand orders combined into the aggregated demand order and code for performing an operation for pegging the plurality of supply orders to the aggregated demand orders.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
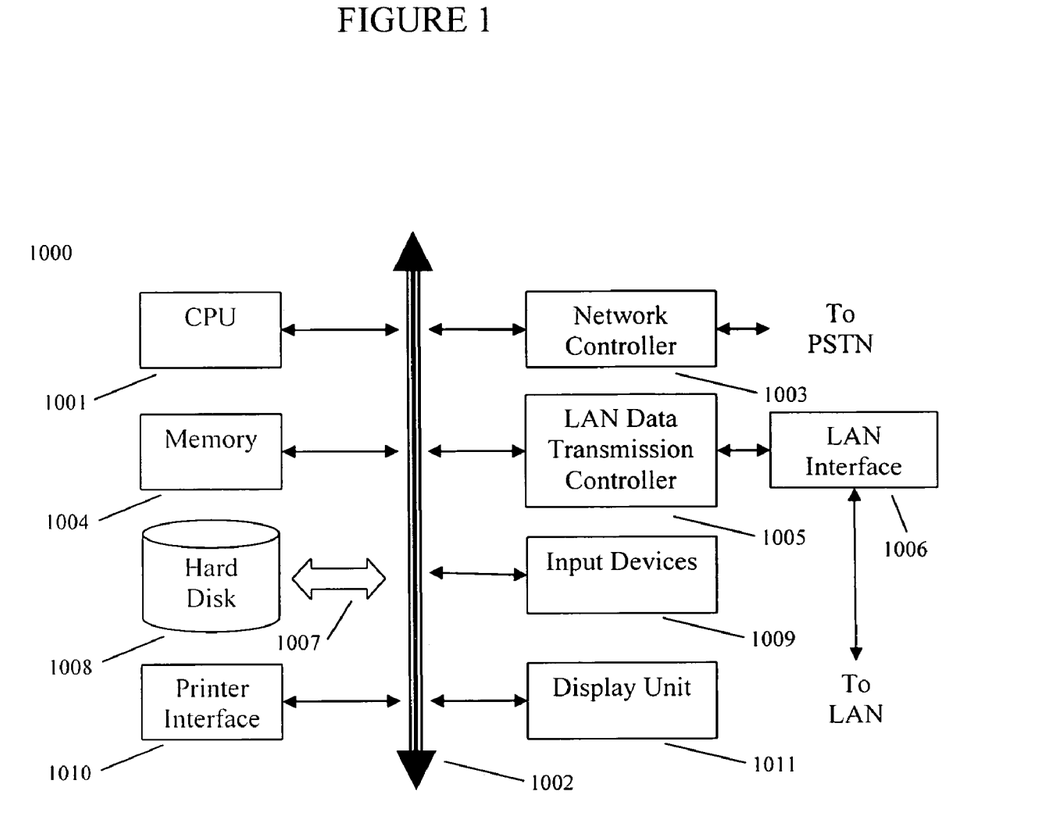
FIG. 1 shows a block diagram of an computer system capable of implementing embodiments of the present disclosure.

FIG. 1 shows an example of a computer system 1000 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 1000 can include a central processing unit (CPU) 1001, program and data storage devices 1004, a printer interface 1010, a display unit 1011, a (LAN) local area network data transmission controller 1005, a LAN interface 1006, a network controller 1003, an internal bus 1002, and one or more input devices 1009 (for example, a keyboard, mouse etc.). As shown, the system 1000 may be connected to a database 1008, via a link 1007.

The computer system 1000 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

According to embodiments of the present disclosure, alerts are calculated based on pegging information. According to an embodiment of the present disclosure, a material requirement planning (MRP) controller for components is provided. Information about the component situation of the planned orders, when looking at the demand/supply situation of the components regarding pegging information and alerts based on pegging is used to determine deviation in quantity and earliness/lateness.

Figure 4:
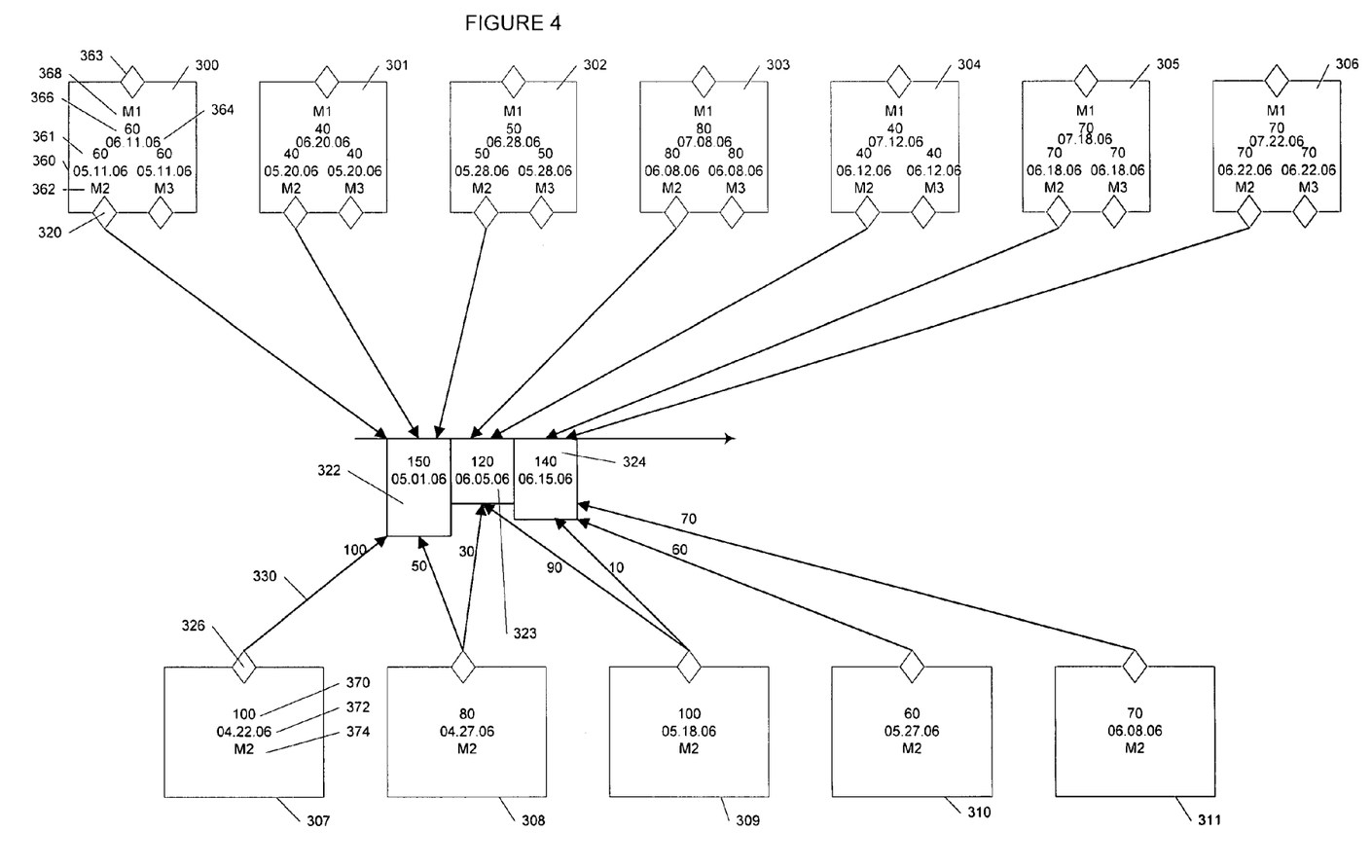
FIG. 4 shows a representation of aggregated time line demands according to embodiments of the present disclosure.

According to embodiments of the present disclosure, individual input nodes (e.g., demands) of orders are aggregated into single demands and into time lines. Pegging is then calculated between supply and the aggregated demands. FIG. 4 will be used to describe various embodiments of the present disclosure. Orders 300-306 consume materials M2 and M3 and produce material M1. As shown, one unit each of M2 and M3 are used to produce each unit of M1. Next to each interface node 320 is the type of material used 362 (M2, M3), the quantity required 361 and the requirements date 360. Next to output node 363 is the type of material produced 368, the quantity produced 366 and the scheduled date of completion of the order 364. Each order 307-311 produces material M2 used by orders 300-306. Next to each output node 326 is the type of material produced 374, the quantity being produced 370 and the projected date of completion 372 of the order. According to this embodiment of the present disclosure, the demands for each type of material are aggregated into separate time lines. Although not shown in FIG. 4 for ease of description, orders that supply material M3 would also be provided. In addition, for ease of description, only the aggregated demand time line for material M2 is shown in FIG. 4.

Order 300 uses 60 units each of M2 and M3 to produce 60 units of M1. The requirements date for materials M2 and M3 for order 300 is May 11, 2006. The requirements date of order 301 for materials M2 and M3 is May 20, 2006, 40 units each. The requirements date of order 302 for materials M2 and M3 is May 28, 2006, 50 units each. According to embodiments of the present disclosure, demands for materials are combined into aggregate demands or buckets. Demands can be combined into buckets on a monthly, weekly, daily, shiftly, hourly, etc. basis, depending on the circumstances. According to other embodiments including the embodiment shown in FIG. 4, the user can be prompted to select arbitrary points in time, each point in time defining a bucket. In this case, the start date of bucket n+1 would be the end date of bucket n. For example, according to the embodiment shown in FIG. 4, the user has selected arbitrary bucket start dates of May 1, 2005, Jun. 5, 2006 and Jun. 15, 2006. Accordingly, as shown in FIG. 4, orders having requirements dates between May 1, 2006 and Jun. 5, 2006 (orders 300-302) are aggregated into bucket 322. Orders having requirements dates between Jun. 5, 2006 and Jun. 15, 2006 (orders 303, 304) are aggregated into bucket 323. Orders having requirements dates after Jun. 15, 2006 (orders 305, 306) are aggregated into bucket 324. For purposes of pegging, the arbitrary bucket start dates are then used as the requirements dates for each bucket. A similar aggregated demand time line can be generated for materials M3. Of course, the interval between bucket start dates can be set by the user to any suitable length of time as desired and can be in terms of years, months, weeks, days, hours, minutes, etc., depending on the situation. Aggregated time line demand or bucket 322 is thus for 150 units of M2 with a requirements date of May 1, 2006. Aggregated time line demand or bucket 323 is for 120 units of M2 with a requirements date of Jun. 5, 2006. Aggregated time line demand or bucket 324 is for 140 units of M2 with a requirements date of Jun. 15, 2006. Pegging can now be performed on the aggregated demands. It will be appreciated that there may be instances where there are empty buckets. That is, there may be situations where there are no demands for materials during that time interval. Empty buckets can be ignored during the pegging process.

Orders 307-311 all produce M2. As shown, order 307 produces 100 units of M2 with an availability date of Apr. 22, 2006. Order 308 produces 80 units of M2 with an availability date of Apr. 27, 2006. According to this embodiment of the present disclosure, pegging is calculated between supply and aggregated demand, thus reducing the number of operations involved and reducing the number of resulting pegging arcs. This makes it easier to visualize the supply and demand of materials. For example, as shown by arrows 330, orders 307 and 308 can be used to satisfy aggregated time line demand 322. A remaining portion of order 308 (30 units) and a portion of order 309 (90 units) can be used to satisfy aggregated time line demand 323. A remaining portion of order 309 (10 units) and orders 310 (60 units) and 311 (70 units) can be used to satisfy aggregated time line demand 324.

Figure 5:
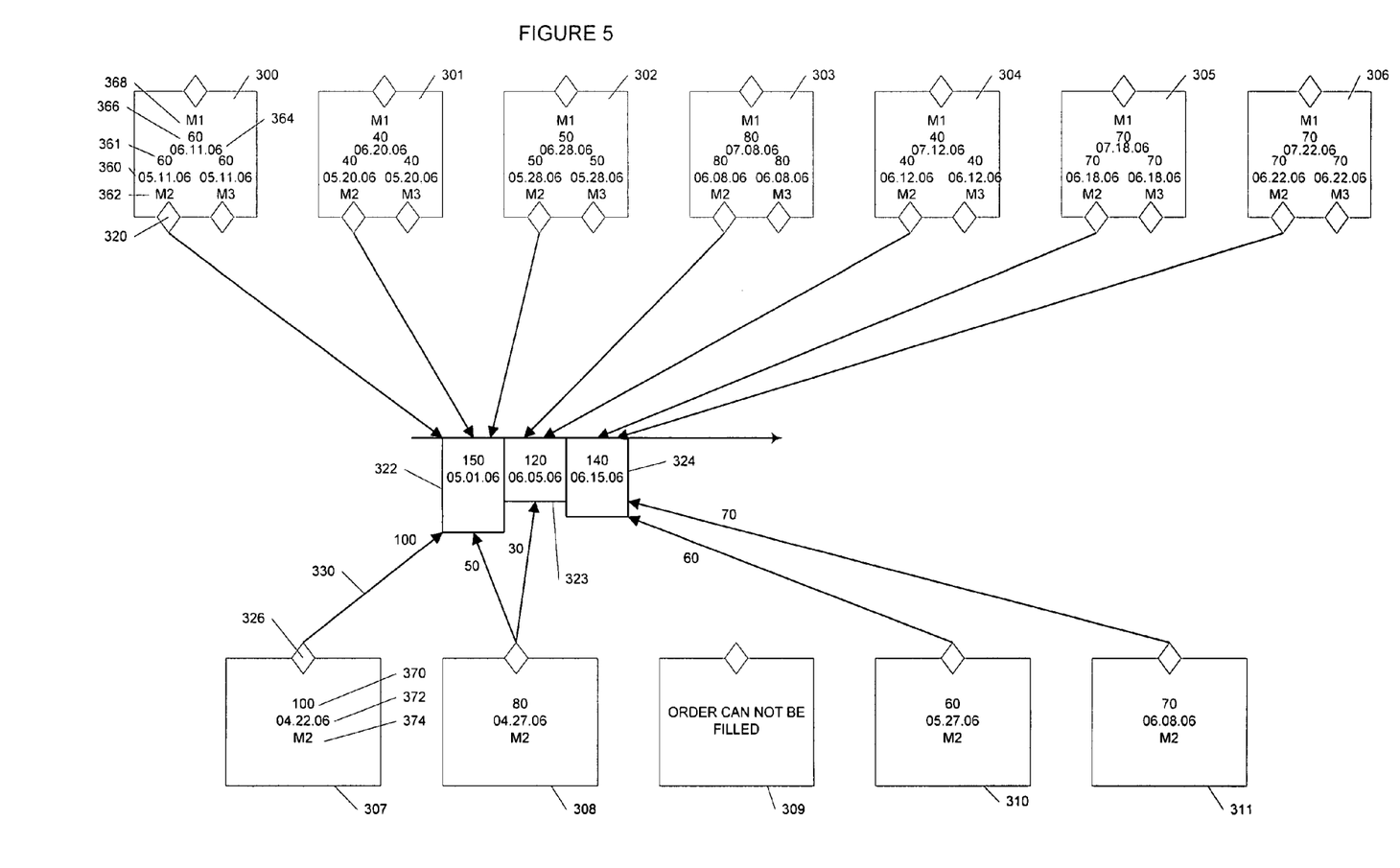
FIG. 5 shows a representation of aggregated time line demands when a supplying order can not be filled, according to embodiments of the present disclosure.

FIG. 5 is similar to FIG. 4 except in FIG. 5, order 309 can not be filled. For example, a manufacturing line for that order may be down or a shipment will not arrive in time. In this case, aggregated time line demand 322 will still be fulfilled by orders 307 and 308. Aggregated time line demand 323 will receive 30 units of M2 from order 308 and none from order 309. Aggregated time line demand 324 will also be short due to order 309 not being filled. Accordingly, an alarm will be issued to indicate that there is a shortage of M2 for aggregated demands 323 and 324. The shortage can be narrowed down to aggregated time line demands 323 and 324, but not to the specific orders that will be shorted. However, the shortage can be narrowed down to a specific time frame. For example, in this case, the shortage can be roughly narrowed down to the June 5, June 15 time frame. In this way, the system can efficiently show alerts for components even though the system can not yet determine the exact orders which will be affected by the shortage, only the time frame when the shortage situation occurs. In many instances, this information will be sufficient to allow appropriate steps to be taken. For example, using this information, orders can be moved to attempt to satisfy or delay the shortage from occurring. However, in certain situations, it may be useful to determine the specific orders that will be affected by the shortage. In order to determine the specific orders affected by the shortage, the following can be used to generate order specific alerts.

Figure 6:
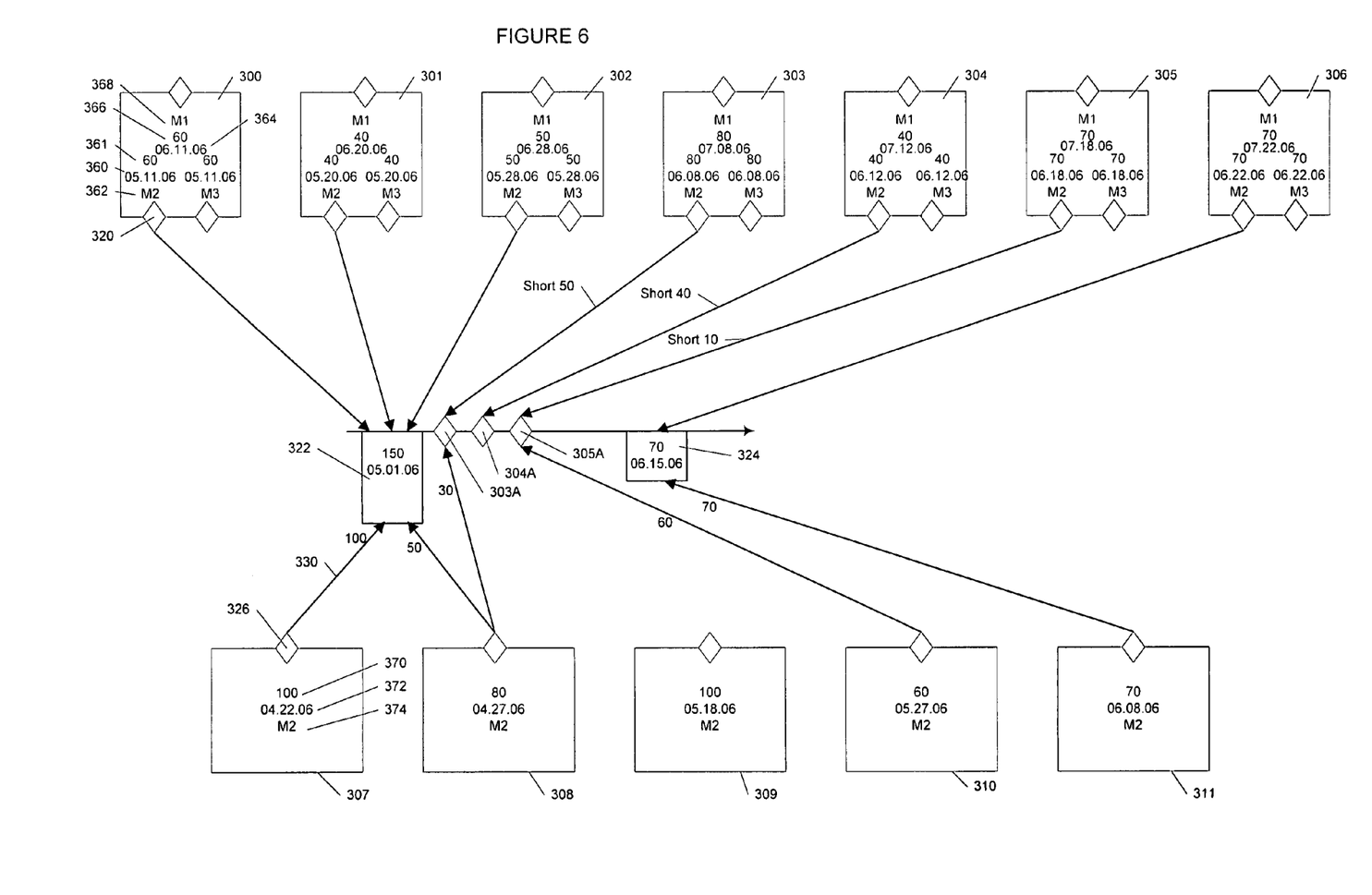
FIG. 6 shows a representation of aggregated time line demands with individual input nodes broken out, according to an embodiment of the present disclosure.

According to this embodiment of the present disclosure, after an alert has been issued indicating there is a shortage with respect to aggregate time line demands 323 and 324, the individual orders forming aggregate demands 323 and 324 can be broken out as shown in FIG. 6. In this example, aggregate demand 323 is formed by individual input demands 303A and 304A. The individual component demands forming aggregate demand 324 can also be broken out. However, it will be appreciated that not all individual demands need to be broken out all the time. In this example, only individual component demand 305A is broken out of aggregate demand 324 and shown individually. Aggregate demand 324 is then reduced by the amount of demand 305A to 70 units as shown. The individual order demands and the aggregated demands can then be pegged to determine which specific orders will be short. As shown, demand 303A is short 50 units indicating that order 303 will be short 50 units of M2. Demand 304A is short 40 units indicating that order 304 will be short 40 units of M2. Demand 305A is short 10 units indicating that order 305 will be short 10 units of M2. Order specific alerts can then be generated if desired for orders 303, 304 and 305.

It ill be appreciated that orders 300-306 in the above-described embodiments may be referred to as demand orders with respect to orders 307-311 by virtue of orders 300-306 demanding materials from orders 307-311. Similarly, orders 307-311 may be referred to as supply orders with respect to orders 300-306, by virtue of orders 307-311 supplying materials to orders 300-306. Of course, orders 307-311 may include input nodes themselves demanding materials from other orders. In this instance, orders 307-311 may be referred to as demand orders, etc. It will be appreciated that supply orders may be materials manufactured at a particular facility or facilities, or products being delivered from a particular facility or facilities.

The above-described systems and methods can be implemented in digital electronic circuitry, or in computer hardware, firmware, software, or in combinations of them. The systems and methods can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the above systems and methods can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to t he user can be any form of sensory feedback, e.g., visual feedback, auditory feedback, or tactile feedback; and input from the user can be received in any form, including acoustic, speech, or tactile input.

The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the invention, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for performing supply chain planning, comprising:

providing a plurality of demand orders, each demand order including at least one input interface node for each type of material required by said demand order, each input interface node identifying a type of material required by said demand order, a quantity of the material required by said demand order and a requirements date the material is required by said demand order;

providing a plurality of supply orders, each supply order including at least one output interface node, each output interface node identifying a type of material provided by said supply order, a quantity of the material provided by said supply order and a date the material is provided by said supply order;

combining input interface nodes for same types of materials from a plurality of said demand orders into an aggregated demand order for each type of material and forming a separate aggregated demand time line for each type of material, each aggregated demand order for each type of material indicating a quantity of the type of material required by a specified date;

performing an operation for pegging the plurality of supply orders to the aggregated demand orders for each type of material; and generating a component alert if the pegging operation indicates a shortage of a material, wherein if an alert is generated, determining one or more aggregated demand orders that caused the alert and breaking out at least one of the individual demand orders forming the aggregated demand order and placing an input interface node corresponding to the at least one of the individual demand orders on the aggregated demand time line.

2. The method of claim 1, further comprising setting a. start date for the aggregated demand order.

3. The method of claim 2, wherein the start date for the aggregated demand order is set arbitrarily by a user.

4. The method of claim 2, wherein an interval between start dates for the aggregated demand orders is set to a fixed period.

5. The method of claim 4, wherein the fixed period comprises at least one of a month, week, day and shift.

6. The method of claim 1, further comprising subtracting the quantity of the material required corresponding to the at least one of the individual demand orders from the quantity of material required for the aggregated demand order.

7. The method of claim 1, further comprising performing a second pegging operation on the aggregated demand time line including the input interface node corresponding to the at least one individual demand orders and the aggregated demands.

8. The method of claim 7, further comprising generating an order specific alert based on results of the second pegging operation.

9. A programmed computer system for performing supply chain planning, comprising:
a processor;
a program storage device readable by the processor, tangibly embodying a program of instructions executable by the processor to perform a method comprising;
providing a plurality of demand orders, each demand order including at least one input interface node for each type of material required by said demand order, each input interface node identifying a type of material required by said demand order, a quantity of the material required by said demand order and a requirements date the material is required by said demand order;
providing a plurality of supply orders, each supply order including at least one output interface node, each output interface node identifying a type of material provided by said supply order, a quantity of the material provided by said supply order and a date the material is provided by said supply order;
combining input interface nodes for same types of material from a plurality of said demand orders into an aggregated demand order for each type of material and forming a separate aggregated demand time line for each type of material, each aggregated demand order for each type of material indicating a quantity of the type of material required by a specified date;
performing an operation for pegging the plurality of supply orders to the aggregated demand orders for each type of material; and
generating a component alert if the pegging operation indicates a shortage of a material, wherein if an alert is generated, determining one or more aggregated demand orders that caused the alert and breaking out at least one of the individual demand orders forming the aggregated demand order and placing an input interface node corresponding to the at least one of the individual demand orders on the aggregated demand time line.

10. The programmed computer system of claim 9, further comprising setting a start date for the aggregated demand order.

11. The programmed computer system of claim 10, wherein the start date for the aggregated demand order is set arbitrarily by a user.

12. The programmed computer system of claim 10, wherein an interval between start dates for the aggregated demand orders is set to a fixed period.

13. The programmed computer system of claim 12, wherein the fixed period comprises at least one of a month, week, day and shift.

14. The programmed computer system of claim 9, further comprising subtracting the quantity of the material required corresponding to the at least one of the individual demand orders from the quantity of material required for the aggregated demand order.

15. The programmed computer system of claim 9, further comprising performing a second pegging operation on the aggregated demand time line including the input interface node corresponding to the at least one individual demand orders and the aggregated demands.

16. The programmed computer system of claim 15, further comprising generating an order specific alert based on results of the second pegging operation.

17. A computer readable medium storing computer executable code for performing supply chain planning, said computer readable medium comprising:
code for providing a plurality of demand orders, each demand order including at least one input interface node for each type of material required by said demand order, each input interface node identifying a type of material required by said demand order, a quantity of the material required by said demand order and a requirements date the material is required by said demand order;
code for providing a plurality of supply orders, each supply order including at least one output interface node, each output interface node identifying a type of material provided by said supply order, a quantity of the material provided by said supply order and a date the material is provided by said supply order;
code for combining input interface nodes for same types of materials from a plurality of said demand orders into an aggregated demand order for each type of material and forming a separate aggregated demand time line for each type of material, each aggregated demand order for each type of material indicating a quantity of the type of material required by a specified date;
code for performing an operation for pegging the plurality of supply orders to the aggregated demand orders for each type of; and
generating a component alert if the pegging operation indicates a shortage of a material, wherein if an alert is generated, determining one or more aggregated demand orders that caused the alert and breaking out at least one of the individual demand orders forming the aggregated demand order and placing an input interface node corresponding to the at least one of the individual demand orders on the aggregated demand time line.

18. The computer recording medium of claim 17, further comprising setting a start date for the aggregated demand order.

19. The computer recording medium of claim 18, wherein the start date for the aggregated demand order is set arbitrarily by a user.

20. The computer recording medium of claim 18, wherein an interval between start dates for the aggregated demand orders is set to a fixed period.

21. The computer recording medium of claim 20, wherein the fixed period comprises at least one of a month, week; day and shift.

22. The computer recording medium of claim 17, further comprising subtracting the quantity of the material required corresponding to the at least one of the individual demand orders from the quantity of material required for the aggregated demand order.

23. The computer recording medium of claim 17, further comprising performing a second pegging operation on the aggregated demand time line including the input interface node corresponding to the at least one individual demand orders and the aggregated demands.

24. The computer recording medium of claim 23, further comprising generating an order specific alert based on results of the second pegging operation.

* * * * *